Aug. 26, 1952 W. STREUN 2,608,377
VALVE OPERATING DEVICE
Filed Oct. 6, 1947
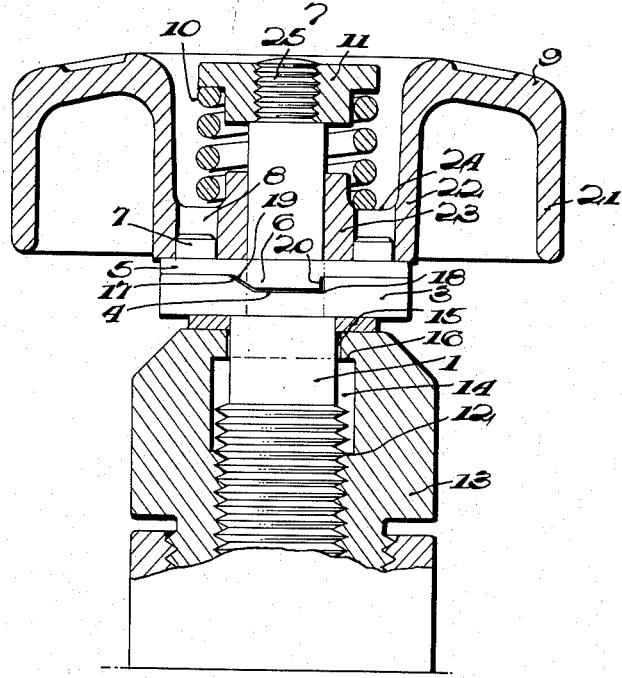
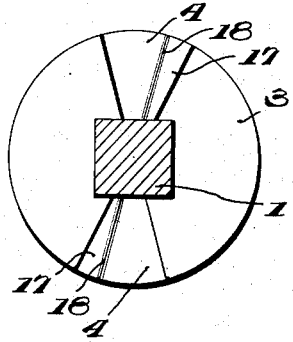
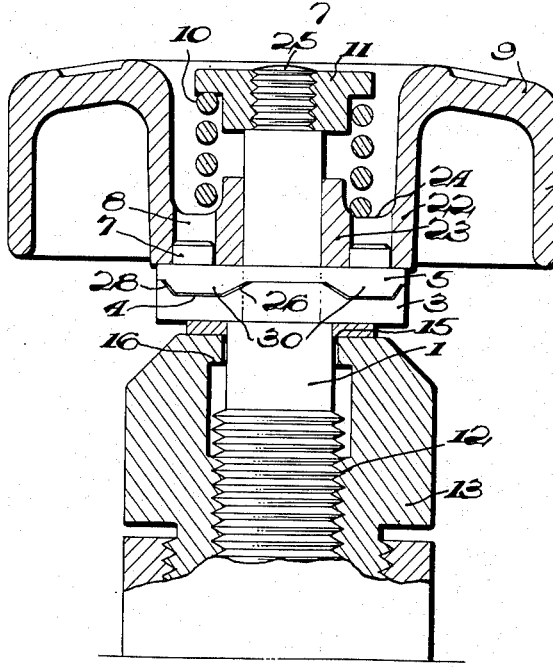
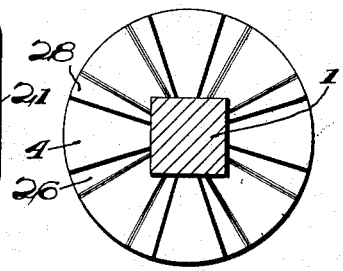
INVENTOR.
Walter Streun
BY
Peck & Peck
attorneys Patented Aug. 26, 1952

2,608,377

UNITED STATES PATENT OFFICE 2,608,377

VALVE OPERATING DEVICE

Walter Streun, Berne-Liebefeld, Switzerland, assignor to George B. Scarlett, Kennett Square, Pa.

Application October 6, 1947, Serial No. 778,117
In Switzerland February 1, 1947

3 Claims. (Cl. 251—150)

This invention relates broadly to the valve operation and controlling art; and in its more specific aspects, it relates to means combined with a manually operable valve controlling handle whereby the application of excessive force to the handle in the operation of closing or opening the valve will not result in damage to the valve; and the nature and objects of the invention will be readily recognized and understood by those skilled in the arts to which it relates in the light of the following explanation and detailed description of the accompanying drawings illustrating what I at present believe to be the preferred embodiments and mechanical expressions of the invention from among various other forms, arrangements, combinations, and constructions, of which the invention is capable within the spirit and scope thereof.

In high pressure valves, such for instance, as those used with carbonic acid or oxygen cylinders, there is the constant danger of damaging the valve by the application of excessive force to the valve controlling handle during a valve closing or opening operation, and it is therefore a primary purpose of my invention to combine means with the valve operating mechanism which will prevent damaging forces to reach the valve when such excessive forces are applied to the valve controlling handle.

It is a further purpose of this invention to combine with a valve controlling member or handle means which is automatically operable when the valve is properly seated or closed to prevent the application of additional seating pressure to the valve, even though such additional or excessive pressure may be applied to the valve controlling handle.

A further purpose of this invention is to combine with a valve controlling member or handle means which is automatically operable when the valve is in full open position, to prevent the application of additional opening pressure to the valve, even though such additional or excessive pressure may be applied to the valve controlling handle.

My invention also includes as another purpose, the interposing of spring loaded means between the valve controlling handle and the valve spindle which permits the handle to rotate relative to the spindle when the resistance of the latter to rotation has reached a certain limit.

And yet another object of this invention resides in a valve operating mechanism in which the closing pressure or the opening pressure on the valve cannot be increased beyond a certain limit by turning the valve controlling handle.

Another object of this invention is to provide means combined with a valve controlling handle to prevent damaging forces being applied to the valve even though applied to the handle, in which the means may be removed and replaced with facility.

With the foregoing general objects, features and results in view, as well as certain others which will be apparent from the following explanation, the invention consists in certain novel features and designs, construction, mounting and combination of elements, as will be more fully and particularly referred to and specified hereinafter.

Referring to the accompanying drawings:

Fig. 1 of the drawings is a view in vertical section through a valve operating and controlling mechanism.

Fig. 2 of the drawings is a view in horizontal section illustrating the working surface of the primary coupling disc.

Fig. 3 of the drawings is a view in vertical section through a modified form of valve operating and controlling mechanism.

Fig. 4 of the drawings is a view in horizontal section of the device of Fig. 3 of the drawings, illustrating the working surface of the primary coupling disc.

In the accompanying drawings, I have used the numeral 1 to designate a valve spindle adapted to carry on the lower end thereof a valve (not shown). The valve spindle is threadedly received as at 12 in a threaded bore in a gland or the like member 13 having an enlarged bore portion 14 provided at its upper end with a restricted opening 15. It will thus be appreciated that due to the restricted neck or opening 15, an annular shoulder 16 is provided.

A section of that portion of the valve spindle 1 which projects beyond member 13 is squared and I fix on this squared section a primary coupling disc 3 which rotates with the spindle. Circumferentially spaced recesses or indentations 4 are formed in the upper face of the coupling disc, and while I show two such recesses in the drawings, it is to be understood that the disc could be provided with only one or with more than two recesses and would function as required. Each recess 4 is provided with a radial surface which is sloping or circumferentially inclined relative to the bottom of the recess as at 17, while the other radial surface 18 of the recess may be substantially perpendicular relative to the recess bottom or floor. The sloping or inclined radial surface of each recess is that one which forms the leading surface of the recess as the disc rotates with the spindle in a valve closing operation.

A secondary coupling disc 5 is supported on the primary coupling disc 3, the spindle 1 extending through the secondary disc in such manner that the secondary disc is axially movable and rotatable relative to the spindle. On the lower surface of secondary disc 5 are circumferentially spaced projections or clutch members 6, complementary to the recesses 4 and in operative position extending thereinto, there being, of course, one projection for each recess and the shape of each projection conforming to that of each recess, thus each projection is formed with a sloping radial surface 19 in contact with recess surface 17, and perpendicular surface 20 in contact with recess surface 18.

Pins 7 project upwardly from the upper surface of secondary coupling disc 5 and are received in bores 8 which are formed in valve operating handle 9. Valve operating handle 9 is of integral generally hollow construction and comprises exterior and interior spaced flanges 21 and 22 respectively, and a central sleeve or hub 23 through which the spindle 1, loosely extends. Sleeve 23 is spaced from flange 22, the two members being connected by an annular web 24 in which the bores 8 are formed.

The uppermost end of spindle 1 is threaded as at 25 for receiving thereon a flanged nut or disc 11 which provides a fixed bearing point for a helical spring 10 which bears at the top against the fixed disc 11 and at its other end against web 24 of the handle 9.

Since the handle 9 and secondary coupling disc 5 are loosely mounted relative to the spindle, the spring 10 will constantly exert downward pressure on the handle and the secondary coupling disc to thereby urge the clutch members 6 into the recesses 4 formed in the primary coupling disc.

With the various elements of the mechanism in operative positions, the clutch members under the action of the spring will be in clutching positions within the recesses in the primary coupling disc, the pins 7 will extend into the bores 8. Thus when the handle is turned to close the valve, the spindle 1 will be rotated since the two coupling discs are in clutching position. When the valve is seated, if more or excessive rotary pressure is applied to the handle, the resistance of the spindle to rotation will overcome the spring pressure in the mechanism, whereupon the secondary coupling disc 5 will overcome the spring pressure and the clutch members thereof will slide or ride up the sloping surfaces of the recesses to thereby cause slippage between the discs to permit rotary movement of the handle and secondary disc without imparting such rotation to the primary disc and valve spindle, and the valve will not be subjected to excessive forces and damaged thereby.

In Figs. 3 and 4 of the drawings, I have illustrated a modified form of my invention and I have used the same reference numerals to designate parts therein which are similar to those disclosed in Figs. 1 and 2 of the drawings. In this form of my invention I have provided a primary coupling disc 3 and a secondary coupling disc 5 for cooperation therewith, the primary coupling disc instead of being provided with only two recesses 4 as in the preferred form of my invention is formed with four of such recesses, and the secondary coupling disc 5 is of course provided with the same number of clutch members 30 for operation within the recesses. This form of my invention includes structure whereby the clutching members or discs provide means to prevent damage to the valve structure when it is being opened as well as when it is being closed. In opening the valve the threads on the spindle may contact the shoulder 16 on gland 13 if the valve is completely opened, and if force is used on the handle by the operator opening the valve it will be obvious that the spindle threads will be damaged by contact with the gland shoulder 16. In order to prevent the occurrence of such damage upon opening of the valve as well as upon closing thereof, I have formed both radial surfaces 26 and 28 of the recesses 4 to slope or incline circumferentially relative to the bottom of the recesses. The clutch members 30 are shaped complementary with respect to the recesses, that is, the clutch members are provided with similarly inclined surfaces, for sliding or slipping operation on the radial recess surfaces.

It will thus be recognized that the secondary coupling disc 5 will ride up on the surfaces 28 of the primary coupling disc 3 when the valve is closed and the pressure of the valve on its seat overcomes the action of spring 10, thereby permitting movement of the handle and the secondary coupling disc relative to the primary coupling disc and the spindle, and in like manner upon opening the valve the clutching members 30 will ride up on the inclined surfaces 26 when the threads 12 engage shoulder 16 and when increased rotary pressure is applied upon the handle, and thus the handle may rotate without causing thread damaging rotation to be imparted to the spindle.

I claim:

1. A valve operating device including a valve spindle adapted to carry a valve and an operating handle therefor movable axially of said spindle and relatively rotatable with respect thereto, said handle including a central sleeve through which said spindle extends and a continuous flange spaced from said sleeve and a web connecting said sleeve and flange providing a recess between the sleeve and the flange, clutching means automatically operable to disconnect said operating handle and valve spindle upon application of excessive force to said handle when the valve is closed, said means including a primary member fixed to the spindle and a secondary member rotatable with said operating handle one of said members having at least one recess therein provided with an inclined radial surface and the other of said members having at least one clutch member projecting therefrom into a recess in the first mentioned member and the clutch member having an inclined radial surface in contact with said first mentioned radial surface, and said secondary member axially movble with said operating handle into and out of clutching relation with said primary member, and a compression spring carried entirely within the recess in the handle, said compression spring maintaining said secondary member in clutching position with said primary member for actuation of the spindle for closing the valve and for releasing said secondary member from clutching position with said primary member when the valve is closed and force is applied to said operating handle.

2. A valve operating device including a valve spindle adapted to carry a valve on one end and having a radial flange on the other end, and an operating handle therefor movable axially of said spindle and relatively rotatable with respect thereto, said handle including a central sleeve through which said spindle extends and an annular flange spaced from said sleeve and a web connecting said sleeve and flange providing a recess between the sleeve and flange, the upper edge of said flange being in a plane above that of the radial flange on the spindle, clutching means automatically operable to disconnect said operating handle and valve spindle upon application of excessive force to said handle when the valve is closed, said means including a primary member fixed to the spindle and a secondary member rotatable with said operating handle one of said members having at least one recess therein provided with an inclined radial surface and the other of said members having at least one clutch member projecting therefrom into a recess in the first mentioned member and the clutch member having an inclined radial surface in contact with said first mentioned radial surface, and said secondary member axially movable with said operating handle into and out of clutching relation with said primary member, and a compression spring carried entirely within the recess in the handle and extending between said radial flange and web, said compression spring maintaining said secondary member in clutching position with said primary member for actuation of the spindle for closing the valve and for releasing said secondary member from clutching position with said primary member when the valve is closed and force is applied to said operating handle.

3. A valve operating device including a valve spindle adapted to carry a valve on one end and having a radial flange on the other end, and an operating handle therefor movable axially of said spindle and relatively rotatable with respect thereto, said handle including a central sleeve through which said spindle extends and an annular flange spaced from said sleeve and a web having spaced openings therein connecting said sleeve and flange providing a recess between the sleeve and flange, the upper edge of said flange being in a plane above that of the radial flange on the spindle, clutching means automatically operable to disconnect said operating handle and valve spindle upon application of excessive force to said handle when the valve is closed, said means including a primary member fixed to the spindle and a secondary member having pins projecting into the openings in the web for rotation of said secondary member with the handle, one of said members having at least one recess therein provided with an inclined radial surface and the other of said members having at least one clutch member projecting therefrom into a recess in the first mentioned member and the clutch member having an inclined radial surface in contact with said first mentioned radial surface, said secondary member being axially movable with the handle into and out of clutching relation with said primary member, and a compression spring carried entirely within the recess in the handle and extending between said radial flange and web, said compression spring maintaining said secondary member in clutching position with said primary member for actuation of the spindle for closing the valve and for releasing said secondary member from clutching position with said primary member when the valve is closed and force is applied to said operating handle.

WALTER STREUN.

REFERENCES CITED

The following references are of record in the file of this patent:

UNITED STATES PATENTS

| Number | Name | Date |
|---|---|---|
| 622,912 | Corey | Apr. 11, 1899 |
| 1,386,455 | Clemens | Aug. 2, 1921 |
| 1,496,059 | Lanzetta | June 3, 1924 |
| 1,534,701 | Gray | Apr. 21, 1925 |
| 1,565,754 | Orth | Dec. 15, 1925 |